Oct. 20, 1970 F. H. GAENSSLEN ET AL 3,535,699

COMPLEMENTARY TRANSISTOR MEMORY CELL USING LEAKAGE CURRENT TO SUSTAIN QUIESCENT CONDITION

Filed Jan. 15, 1968 2 Sheets-Sheet 1

INVENTORS
FRITZ H. GAENSSLEN
DOMINIC P. SPAMPINATO

BY Thomas J. Kilgannon Jr.
ATTORNEY

Oct. 20, 1970 F. H. GAENSSLEN ET AL 3,535,699

COMPLEMENTARY TRANSISTOR MEMORY CELL USING LEAKAGE CURRENT TO SUSTAIN QUIESCENT CONDITION

Filed Jan. 15, 1968 2 Sheets-Sheet 2

United States Patent Office
3,535,699
Patented Oct. 20, 1970

3,535,699

COMPLEMENTARY TRANSISTOR MEMORY CELL USING LEAKAGE CURRENT TO SUSTAIN QUIESCENT CONDITION

Fritz H. Gaensslen, Yorktown Heights, and Dominic P. Spampinato, Ozone Park, N.Y., assignors to International Business Machines Corporation, Armonk, N.Y., a corporation of New York Filed Jan. 15, 1968, Ser. No. 697,713
Int. Cl. G11c *7/00, 11/40*
U.S. Cl. 340—173 14 Claims

ABSTRACT OF THE DISCLOSURE

A memory cell in which the load devices thereof are the complement of the devices of the cross-coupled or storage devices of the cell. Thus, where the load de-devices are npn devices, the storage devices are pnp devices and vice versa. The load devices, in the active state of the cell, i.e., when reading or writing is taking place, act as drivers to place one or the other of the storage devices in an ON condition or provide a path for current to detect the state of the storage devices. In the quiescent state, the load devices are turned off but, a backward biased pn junction portion of the load device acting in conjunction with a backward biased pn junction portion of a storage device provides, at a node to which the gate capacitance of a storage element is connected, a voltage which maintains the charge on the ON device during the quiescent state. The voltage at the node results from a voltage division of a substrate voltage between the serially disposed pn junctions which divides in such a way that substantially all the voltage across the pn junctions is dropped across the pn junction of the storage device resulting in that voltage being applied to maintain the gate capacitance of the ON storage element during the quiescent state of the memory cell. A plurality of complementary memory cells arranged in array form which is read out nondestructively is also disclosed.

BACKGROUND OF THE INVENTION

Field of the invention

This invention relates generally to information storage arrangements which utilize stored charge memory cells as a basic element of the storage arrangements. More specifically, it relates to active electronic memory arrangements in which a plurality of field effect transistors are connected in complementary pairs to provide a memory cell which requires no separate source for stand-by power in the quiescent state; utilizes a minimum of active devices; eliminates the usually required separate driver and load devices by incorporating their functions in one device; and can be implemented in a relatively small area because the number of devices used has been reduced to a minimum.

Description of the prior art

Devices which store electrical energy in various forms have been known for a number of years and, since the discovery of the field effect transistor (FET), a number of circuits have evolved which take advantage of the ability of the FET to store charge and act as a memory cell in arrangements which are built around a basic flip-flop configuration. Most of the known arrangements utilize anywhere from six to eight FET devices in conjunction with other circuit elements. The common factor in all the prior art devices is the utilization of a circuit, when the cell is in the quiescent state, which maintains charge on the gate capacitance of the ON portion of a bistable circuit or flip-flop. This circuit provides a low current through a high impedance to compensate for the leakage of charge from the gate capacitance through the OFF portion of the flip-flop to ground. When it is appreciated that maintenance of charge on the storage device is a major factor in the design of known memory cells requiring additional devices having special characteristics which require relatively large layout area, it can be seen that any reduction in either the number of devices or layout area of such devices represents an end result which would find immediate acceptance by practitioners in the monolithic memory art.

Where separate load devices are used to maintain charge in the quiescent state, the trend is not toward reduced layout area. For example, to obtain extremely high resistance using FET devices (which would limit dissipatation) the length to width ratio of the device becomes very large and requires more layout area than lower resistance FET devices. Further, even if such high resistances were obtainable using FET devices, the restrictions on operating conditions of memory cells incorporating such load FET's are rather severe because of the changing voltage seen at a node of the memory cell which, to attain most favorable operating conditions, should be substantially constant. Thus, in known prior art memory cells, the designer is faced with a number of trade-offs, the choice of any one of which results in the degradation of some other parameter which, in turn, militates against obtaining the ultimate in design. Design trade-offs are particularly disadvantageous where memories of large capacity are being built because the acceptance of one trade-off relative to another usually results in economic losses which are out of proportion to the advantage gained.

SUMMARY OF THE INVENTION

The apparatus of the present invention, in its broadest aspect, comprises a memory cell which consists of two FET devices connected in a cross-coupled or flip-flop configuration. Switching FET's, which are devices complementary to the devices of the cross-coupled FET's, have their gates connected to a common word line and each of their sources connected to a bit-sense line. A switching FET is connected in series with each of the FET's of the flip-flop at a node to which an electrode of each of the flip-flop devices and a cross-coupled gate of an opposing flip-flop are connected. Pulsed sources are coupled to the bit-sense lines and to the word line to apply an appropriate pulse pattern for writing into the cell and for nondestructively reading stored information out of the cell. A leakage path is also provided which, regardless of the variation in the voltages across the FET's of the memory cell, provides a substantially constant current which establishes a voltage at the node which maintains charge on the gate capacitance of the ON FET during the quiescent state. This current is extremely low and results in extremely low power dissipation during the quiescent or stand-by state of the memory cell. Using the complementary arrangement of devices, a single switching or load device performs the duel functions of switching during the read and write functions and acts as a portion of a nonlinear voltage divider which is particularly important during the quiescent state of the memory cell.

In accordance with a more specific aspect of the invention, two FET devices, one of which is the complement of the other, are connected in series and disposed in parallel relationship with a like pair of series connected FET devices. The sources of two like FET's are grounded while their drains are cross-connected to the gates of the opposing FET to form a well-known bistable or flip-flop arrangement. The same drains are each connected in series with another FET which is the complement of the FET to which it is connected. The transconductances (*gm*) of the series connected pairs may be the same. However, the transconductance of the flip-flop FET should in no case be less than the transconductance of the switching or load FET's. In a preferred arrangement, the (*gm*) of the flip-flop FET is greater than the (*gm*) of the switching or load FET's. By making the (*gm*) of the flip-flop FET greater than that of the load or switching FET, when reading occurs, current flowing through the ON portion of the cell will cause a voltage drop across the load FET which is higher than the voltage drop across the ON FET of the flip-flop. The object is to cause as low a voltage as possible at the drain of the flip-flop FET so there will no danger of turning ON the OFF FET by exceeding its threshold voltage. The drain of the ON FET, it will be recalled, is cross-coupled to the gate of the OFF FET.

The gates of the switching or load FET's are connected to a pulsed source over a word line; while the sources of the same devices are each connected in series with pulsed sources over bit lines. A pulse pattern consisting of a positive excursion on the word line which turns on the switching or load FET's and a positive excursion of voltage on one of the bit lines causes the state of the flip-flop to be set where the flip-flop FET's are p-channel enhancement mode devices and the load devices are n-channel enhancement mode devices. Reading is accomplished by applying a positive voltage excursion only to the word line which causes current to flow through the ON portion of the flip-flop and its series connected switching or load FET and a bit-sense line. The current flow is detected in an appropriate sense amplifier.

During the quiescent state, charge tends to leak off the gate capacitance of the ON device of the flip-flop. Provision is made, however, for supplying a current during the quiescent state of the flip-flop, which maintains the charge and thereby the voltage at a desired level. When the memory cell is quiescent, both load or switching devices are nonconducting and the FET devices of the flip flop are electrically isolated from the voltage applied by a pulsed source connected to each of the load FET's. At this point, however, a path for current flow exists between a voltage source connected to the substrate of each of the load FET's through a backward biased pn junction of the load FET and a backward biased junction of a flip-flop FET to ground via the substrate which is at ground potential. In this arrangement, the total substrate voltage is dropped in the series connected pn junctions. Since it is desired to maintain the voltage on the gate capacitance at a level to which it was charged, the characteristics of the pn junctions are adjusted during fabrication to permit a leakage current to flow which is governed by controlling the junction area or the doping level of the pn diffusions of the flip-flop FET to permit a lower backward biased leakage current. In this way, substantially the total substrate voltage can be dropped across the backward biased pn junction of the flip-flop thereby maintaining the gate capacitance at the same voltage level to which it was originally charged. Two things are accomplished by such control of the leakage current. The first is that the ON FET of the flip-flop is not subject to a reduction in sense current due to a reduced voltage on its gate electrode and the second is that extremely low leakage currents can be provided which reduce dissipation during the quiescent state.

It is, therefore, an object of this invention to provide a memory cell which requires a minimum number of FET devices.

Another object is to provide a memory cell in which standby power is reduced to a minimum.

Still another object is to provide a memory cell in which the complementary load or switching FET's perform the dual function of switching and charge maintenance.

Yet another object is to provide a memory cell which requires a minimum of layout area because of the elimination of separate load devices.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1A:
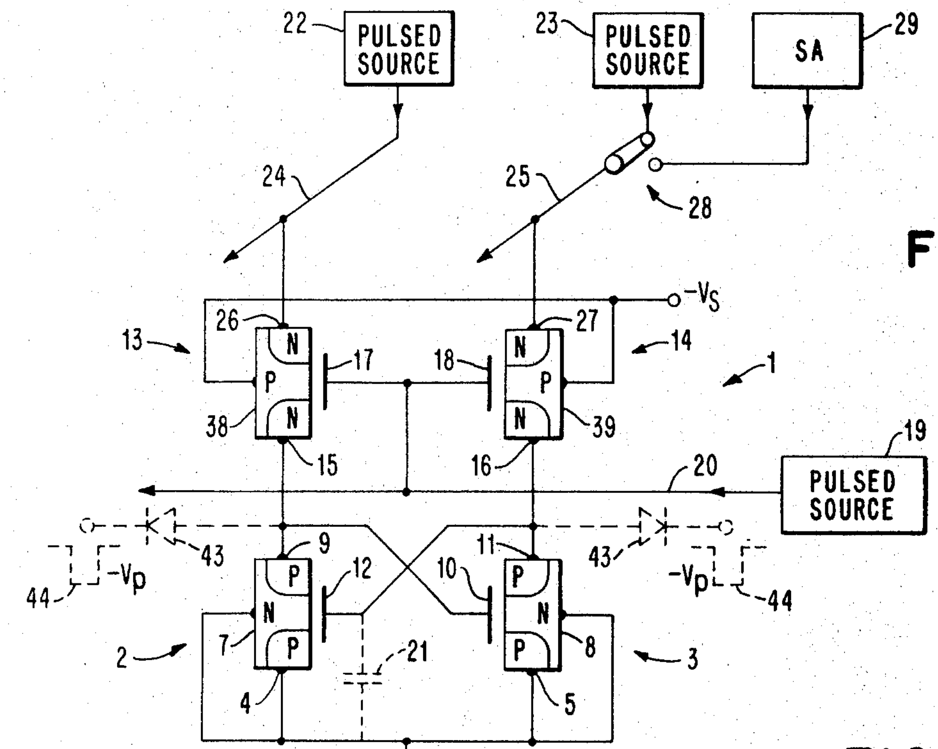
FIG. 1*a* is a schematic diagram of a memory cell in accordance with the present invention showing the complementary arrangement of FET devices and the associated pulsed sources required for reading and writing.
Figure 1B:
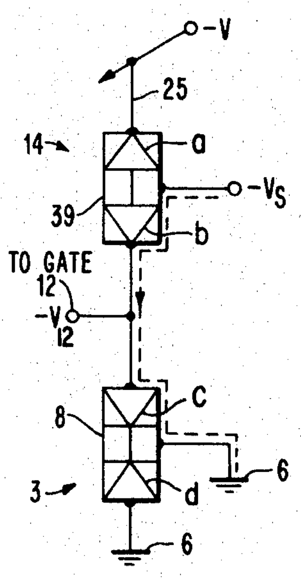
FIG. 1*b* is a schematic diagram of the OFF portion of the memory cell of FIG. 1*a* showing in detail the leakage current path and the voltages resulting therefrom when the memory cell is in the quiescent state.
Figure 1C:
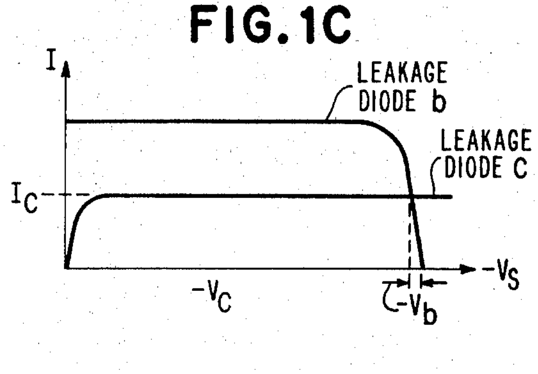
FIG. 1*c* is a graphical representation of the current-voltage characteristics of a load or switching FET backward biased pn junction and an FET flip-flop backward biased pn junction each having different leakage characteristics.

Referring now to FIG. 1, a memory cell in accordance with the present invention is shown generally at 1. Memory cell 1 consists of four field effect transistors all of which, for purposes of illustration, operate as normally OFF or enhancement mode devices.

In FIG. 1, two identical field effect transistors (hereinafter called FET's) 2, 3 of the pnp or p-channel variety are shown schematically with their sources 4, 5, respectively, connected to a common ground 6. Substrates 7, 8 of FET's 2, 3, respectively, are also connected to ground 6. The drain of FET 2 is shown connected to gate 10 of FET 3 and drain 11 of FET 3 is shown connected to gate 12 of FET 2. A circuit arranged in the configuration just described is a typical bistable circuit or flip-flop well known to those skilled in the semiconductor art.

Connected in series with FET's 2, 3 are switching or load FET's 13, 14, respectively. FET's 13 are substantially identical but differ from FET's 2, 3 in that their transconductance (*gm*) is equal to or lower than the transconductance of FET's 2, 3. The reason for this has been indicated previously. Also, FET's 13, 14 differ from FET's 2, 3 in that they are of the npn or n-channel variety. Thus, the load FET's 13, 14 are the complements of the flip-flop FET's 2, 3.

In FIG. 1, the drains 11, 12 of FET's 2, 3, respectively are connected to drains 15, 16 of FET's 13, 14, respectively. Gates 17 18 of FET's 13, 14, respectively, are shown connected in parallel in FIG. 1 and are connected to a pulsed source 19 via word line 20.

Assuming FET 2 to be in the ON state, charge is stored in the gate capacitance of FET 2 as represented by the dotted capacitor 21 interconnected between gate 12 and source 4 of FET 2. An objective of the circuit of FIG. 1 is to maintain charge stored in capacitor at a desired level so that the output of the ON portion of the flip-flop is of sufficient amplitude during a read cycle to activate a sense amplifier which detects the state of the flip-flop.

In FIG. 1, pulsed sources 22, 23 are shown connected via bit-sense lines 24, 25 to the sources 26, 27 of FET's 11, 12, respectively. A switch 28 is shown interposed in bit-sense line 25 interconnecting pulsed source 23 with FET 14 in one position and, in its other position, interconnecting FET 14 with a sense amplifier 29. Sense amplifier 29 responds to the flow of current through the ON FET of the flip-flop and the serially disposed switching or load FET when the latter is energized during a reading period from pulsed source 19. At all other times, bit-sense line 25 is connected to pulsed source 23 which is either energized or not energized during a writing period to change the state of memory cell 1.

Figure 2:
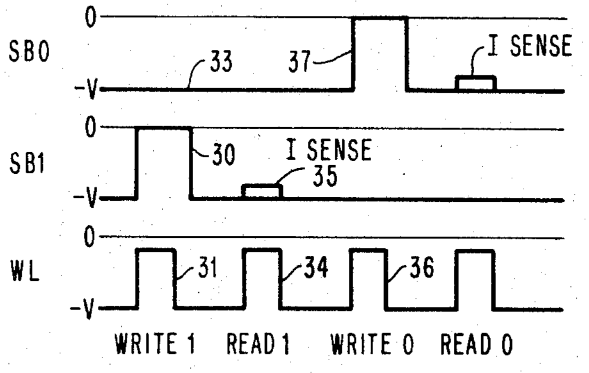
FIG. 2 is a representation of the voltage and current pulse patterns applied and obtained during reading and writing.

Writing into and reading out of memory cell 1 of FIG. 1 is accomplished using pulse patterns shown in FIG. 2 during respective writing and reading periods.

Assuming, for purposes of illustration that FET 2 is in the ON or conducting state from a previously applied pulse pattern and that it is desired to change the state of the flip-flop, the following mode of operation is utilized.

Changing the state of the flip-flop is a write operation which is accomplished by changing the voltage to a bit-sense line connected to the load FET which is in series with the FET of the flip-flop which is to be turned ON. At the same time, voltage is applied via a word line to turn on the switching or load FET's.

Thus, in FIG. 1, with FET 2 in the ON state, gate 10 of FET 3 effectively "sees" about zero volts thereby maintaining FET 3 in the OFF state. At this point, voltages are simultaneously applied via word line 20 from pulsed source 19, to gates 17, 18 or FET's 13, 14, respectively, and to source 27 of FET 14, via bit-sense line 25. The pulse pattern applied to memory cell 1 is shown in FIG. 2. At this point, it should be recalled that npn devices such as FET's 13, 14 of FIG. 1 can be turned on by applying a voltage which is more positive than the voltage on the source of that device and, that pnp devices such as FET's 2, 3 of FIG. 1 can be turned on by applying a voltage which is more negative than the voltage on the source of that device.

Thus, on bit-sense line 25 the voltage is raised from some negative value to ground potential as shown in FIG. 2 as pulse 30. On word line 20, the voltage is raised from some negative potential to a less negative potential and is shown in FIG. 2 as pulse 31. At this point, it should be appreciated that drain 16 of FET 14 is at a potential which is substantially equal to a voltage of —V. This value of voltage in conjunction with the voltage level of pulse 31 applied to gate 18 of FET 14 which is more positive than the value of —V, causes FET 14 to conduct. What has happened is that electrically drain 16 has become a source and source 27 has become a drain. This action is possible because of the bi-directional characteristics of unipolar devices.

When FET 14 is turned on, the voltage at drain 11 of FET 3 is dropped to zero because, at that instant, the voltage on word line 25, as shown by pulse 30, is also zero. Zero potential on drain 11 causes the potential on gate 12 to drop to zero thereby turning FET 2 to the OFF state. At the same time, pulses 30 and 31 are being applied to memory cell 1, the potential applied via bit-sense line 24 from pulsed source 22 remains at a potential of —V shown a 33 in FIG. 2. A potential less negative than —V, shown at 31 an FIG. 2 is also being applied to gate 17 of FET 13 via word line 20 at the same time it is applied to gate 18 of FET 14. The application of these voltages, which meet the criteria for turning on an npn device, causes FET 13 to conduct causing the voltage —V to appear at drain 9 of FET 2 which is now in the OFF condition. The voltage —V at drain 9 of FET 2 also appears on gate 10 of FET 3 turning FET 3 to the on state. The criteria for turning on a pnp device are met inasmuch as gate 10 is more negative than source 5 of FET 3. The removal of pulse 31 from word line 20 turns off FET 13, 14 and voltages on bit-sense lines 24, 25 are returned to a —V voltage. Memory cell 1 has been switched and the formerly OFF FET 3 is now in the ON state.

To determine the state of memory cell 1, reading is undertaken by applying only a positive going voltage pulse to word line 20 from pulse source 19. This pulse shown at 34 in FIG. 2, turns on FET's 13, 14 which in conjunction with ON FET 3 causes current to flow through ON FET 3, FET 14 and bit-sense line 25. Current flow, represented by pulse 35 in FIG. 2, is sensed in sense amplifier 29 which is electrically coupled to bit-sense line 25 by the actuation of switch 28. The turning on of FET 13 by pulse 34 also has the effect of applying a voltage —V shown at 33 in FIG. 2, to gate 10 of FET 3 thereby bringing the charge on the gate capacitance up to the maximum level attainable. Read out of memory cell 1 is, therefore, nondestructive.

Switching FET 2 to the ON state is accomplished in substantially the same manner as described above in connection with switching FET 3 to the ON state with the exception that a pulse from pulsed source 22 is applied via bit-sense line 24 to FET 13. Pulses 36, 37, as shown in FIG. 2, are applied from pulsed sources 22 and 17, respectively.

In FIG. 2, it should be noted that the voltage applied to each of the bit lines 24, 25, are held, during switching, at the desired voltage levels for a long period of time than the time at which the voltage level on word line 20 is held during switching. This is done to make certain that gater 10, 12 of FET 3, 2, respectively, are not exposed to a changing voltage before FET's 13, 14 are turned off by removal of voltage from word line 20.

As noted hereinabove, retention of charge stored on the gate capacitance of the ON device of the flip-flop is a significant aspect in the operation of FET memory cells. It is during the quiescent state that the condition of the memory must be maintained to compensate for leakage from the gate capacitance of the ON device during the quiescent state. As also noted hereinabove, reading the memory cell applies the proper voltages to maintain the ON device but, it is clear that conditions may arise when reading of the cell is attempted after charge has leaked off the gate capacitance of the ON device. To obviate such a problem, charge is usually applied constantly using additional devices in the circuits and, significant currents are required resulting in high power dissipation. The circuit of FIG. 1, eliminates the requirement for the use of separate devices because it was recognized that a leakage path could be provided by taking advantage of the complementary arrangement of the FET's 2, 3 and 13, 14 particularly with respect to the leakage paths formed by virture of the series arrangement of FET's 2 and 13 and FET's 3 and 14.

FIG. 1*b* shows a schematic diagram of FET's 3 and 14 with an *n* and *p* diffusions normally incorporated in FET devices shown as diodes for purposes of explanation. FET's 3 and 14 are assumed to both be in the OFF tate; a writing cycle having just been completed which placed a voltage —V on the gate 12 of ON FET 2. In FIG. 1*b*, this voltage is designated as $-V_{12}$. FET 14 is represented by back-to-back diodes *a*, *b*, both of which are backward biased by substrate bias $V_s$ which is connected to substrates 38, 39 and shown also in FIG. 1. FET 3 is also represented by diodes *c*, *d* which are disposed in a face-to-face relationship in FET 3. Substrate 8 of FET 3 is grounded. By virtue of the arrangement shown, a series path is formed by voltage source $-V_s$, substrate 39, backward biased diode *b*, backward biased diode *c*, substrate 8, and ground 6. The flop of current in the path defined is, of course, a leakage current and is governed by the leakage resistance of the backward biased diodes $b$ and $c$. Since it is desired to maintain the voltage $V_{12}$, at that level, and since the total voltage ($-V$) across the series path defined above must be dropped in the impedances represented by backward biased diodes $b$, $c$, it was recognized that a voltage division could be made to occur whereby substantially the total voltage $-V_s$ could be dropped across diode $c$ by adjusting the leakage current of diode $c$ to be significantly lower than that of diode $b$. The leakage current can be adjusted during fabrication by adjusting the area of the pn junction or by control of doping levels during diffusion. The total current through the above defined series path is then governed by the leakage current of diode $c$. The characteristic of diode $b$ should be such that at the current value which is controlled by diode $c$ only a very small voltage drop occurs across diode $b$ and substantially the total voltage $-V_s$ (which is approximately equal to $V_{12}$) is dropped across diode $c$.

FIG. 1$c$ shows typical diode voltage-leakage current characteristics which would produce the desired voltage division between diodes $b$, $c$. Thus, the curve labeled leakage diode $c$ has a current which is substantially independent of voltage after an initial variation with applied voltage. The curve labeled leakage diode $b$ also has a current which is substantially independent of voltage after an initial variation with voltage and is shown reversed with respect to the curve of diode $b$ to clearly indicate the amount of voltage dropped by diode $b$ with the current of diode $c$ passing through it. Since the current of the curve of diode $c$ is much smaller than that which could be attained by diode $b$, at the current of diode $c$, which is the maximum attainable through the series connected diodes ($I_c$ in FIG. 1$c$), the voltage drop across diode $b$ is equal to a value which is very small relative to $-V_s$ and shown in FIG. 1$c$ as $-V_b$. The voltage drop across diode $c$ is shown in FIG. 1$c$ as $-V_c$ which is substantially equal to $-V_s$. Thus, the voltage $-V_c$ which is substantially equal to $-V_s$ and $-V_{12}$ is maintained on gate 12 on ON FET during the quiescent state of memory cell 1 keeping in the charge on the gate capacitance of that device substantially constant.

It should also be appreciated that a leakage current is the only current which flows through the ON device of the flip-flop quiescently. Assuming in FIG. 1$b$, that FET 3 is ON, a substantial short-circuit path to ground is presented. However, FET 14 is not conducting and pn junction $b$ between voltage $V_s$ and ground now controls the leakage current and substantially the total voltage $-V_s$ is dropped across diode $b$.

An experimental circuit incorporating the teaching of the present invention was fabricated which utilized FET's commercially available from Raytheon and Motorola under the designations FN 1024 and MM 2102, respectively. The flip-flop FET's utilized (FN 1024) had a transconductance during operation of approximately 2000$\mu$ mhos while the load or switching FET's (MM 2102) had a transconductance of approximately 1000$\mu$ mhos. In operation, the experimental circuit required a positive amplitude excursion of 6 to 8 volts from a negative voltage on the word line, while a positive amplitude excursion to ground potential from a negative voltage of 6 to 8 volts was required on the bit-sense lines. A substrate voltage of minus 6 to 8 volts was applied to the substrate of the load or switching FET's.

Returning to FIG. 1, only a single sense amplifier 29 is shown connected to bit-sense line 25 via switch 28. It should be understood that a sense amplifier similar to amplifier 29 could be connected to bit-sense line 24 in the same manner as amplifier 29 is connected to bit-sense line 25. The present arrangement merely halves the number of sense amplifiers required without affecting the overall operation of the circuit since the lack of an output current on a bit-sense line is just as significant as an output on a bit-sense line. It should be apprecited, however, that a differential amplifier, well known to those skilled in the electronics art, connected to the bit-sense lines of a memory cell may be utilized. The advantage of such an arrangement is that noise cancellation is obtained.

Figure 3:
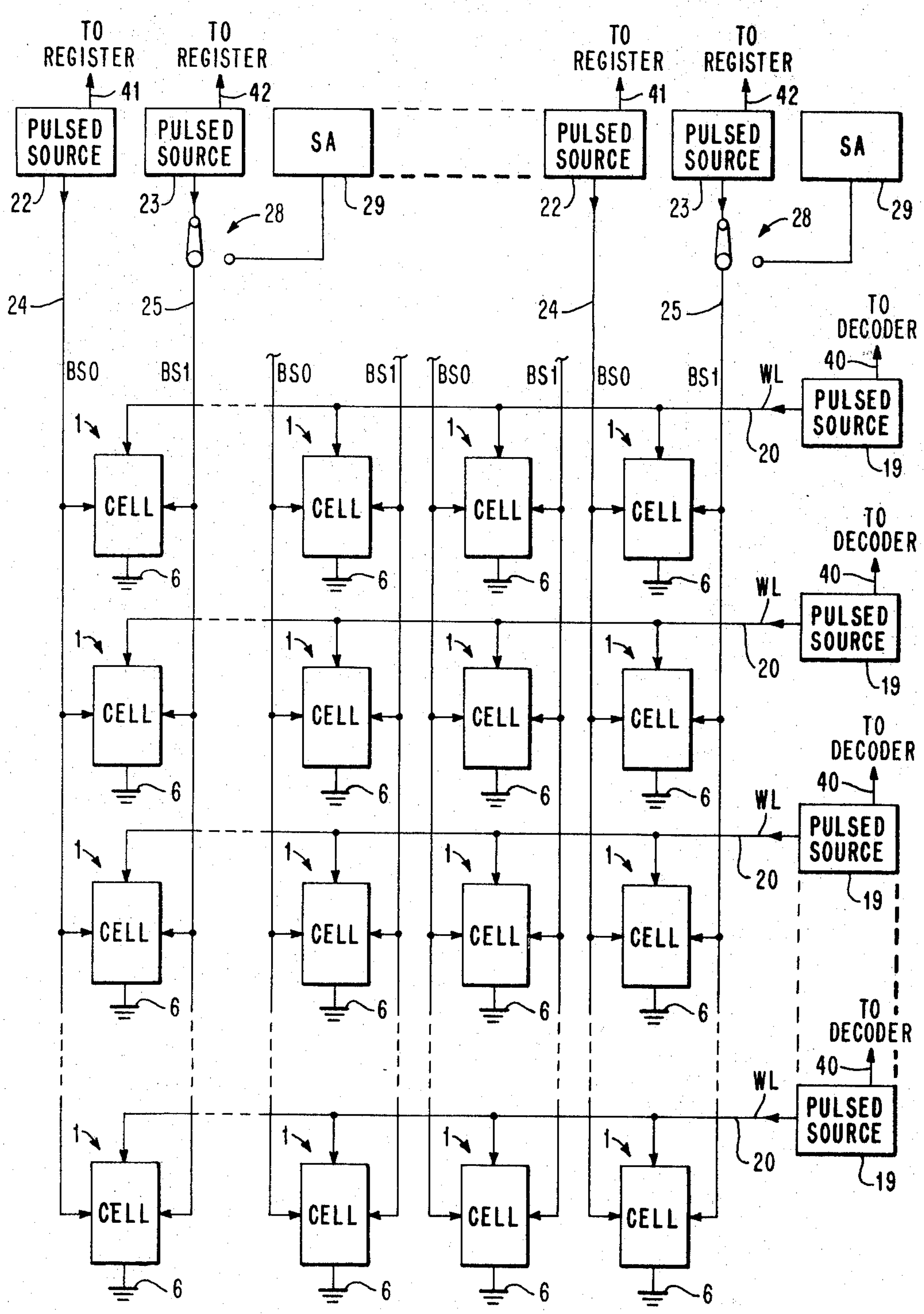
FIG. 3 is a schematic diagram of a plurality of cells of FIG. 1 connected in array form to show the operation of memory cells in a typical memory environment.

Referring now to FIG. 3, a schematic diagram of a plurality of cells of FIG. 1 is shown connected in array form to show the operation of memory cells in a typical memory environment. The reference numbers used in FIG. 1 are applied to the corresponding elements in FIG. 3 and memory cell 1 is shown, for purposes of simplification, as a "black box" with the required connections electrically coupling the circuit arrangement of FIG. 1 internally of the "black box."

In FIG. 3, a plurality of memory cells 1 are shown disposed in rows and columns to form an array which may have any number of bit positions in accordance with given design requirements. A bit position corresponds to a memory cell and a number of bit positions or cells associated with the same word line make up or store a word. As shown in connection with FIG. 1, memory cell 1, can be selectively energized to assume one of its two possible states thereby storing information in binary form.

In FIG. 3, each of the memory cells 1 in any column is connected via bit lines 24, 25 to pulsed sources 22, 23, respectively, during a write period and bit line 25 is connected via switch 28 to a sense amplifier 29 during a read period. Sense line 25 is designated in FIG. 3 as BS1 indicating that information stored by way of line 25 when activated is representative of a binary one while sense line 24 is designated as BS0 indicating that information stored by way of bit line 25 when activated is representative of a binary zero.

Pulsed sources 19 are shown in FIG. 3 connected by way of word lines 20 to a plurality of rows of memory cells, 1, each row containing a plurality of memory cells 1. Pulsed sources 19 are energized from a decoder (not shown) via connections 40 which selects only one of word lines 20 when information is to be written into or read from memory cells 1 associated with that one word line. When a word of information is to be stored, one of the pulsed sources 22, 23 is simultaneously energized along with a single pulsed source 19 from a register or the like (not shown) via connections 41 or 42, respectively.

To read information into the top row of cells 1, pulsed source 19 associated with the top row is energized and, at the same time, some combination of pulsed sources 22 or 23 are energized to write binary ones or zeros into each of the memory cells 1 of the top row. If all the cells of the top row are to assume a binary one state, pulsed sources 23 are energized and information is applied over lines 25 (further designated as BS1) simultaneously with the energization of the word line 20 of the top row. When the cells 1 of the top row are to assume a binary zero state, they are energized from pulsed sources 22 via bit lines 24 (further designated as BS0) simultaneously with the energization of word line 20 of the top row from its associated source 19. The information placed in cells 1 of the top row could have been stored in any other row by simply energizing pulsed source 19 associated with that row rather than the source 19 associated with the top row. To read out information stored in the cells 1 of any row, the cells 1 of that row are energized from the source 19 associataed with that row over its word line 20 and current flow or no current flow is detected in each of the sense amplifiers 29 depending on the state of each individual cell. Each of the cells 1 is written into, read from and maintained in a given state in the same manner described in connection with FIG. 1.

While the invention has been described hereinabove, in connection with specific devices, it should be appreciated that npn devices can be substituted for pnp devices as long as the complementary arrangement of the circuit is maintained. Where, for instance, pnp devices are used as the load or switching transistors, and npn devices are used as flip-flop transistors, the pulse patterns of FIG. 2 are modified to have all the pulses as negative going pulses from a positive voltage +V.

It should also be appreciated that the circuit of FIG. 1 is also operable as a simple bistable circuit in which one or the other of FET's 2, 3 is placed in a conducting condition by the application of a negative pulse from some input means connected to the gate electrodes 10, 12 of FET's 3, 2, respectively. A diode 43, shown dotted in FIG. 1 may be utilized to apply a negative ($V_p$) 44 to either of the gates 10, 12 thereby causing one or the other of FET's 2, 3 to conduct.

In the foregoing, reference has been made to the active and quiescent states of the memory cell. It should be understood if it is not already apparent, for purposes of the foregoing disclosure, that reading and writing operations are accomplished during the active state and any other time is considered to be the quiescent state.

What has been disclosed in a memory cell incorporating complementary pairs of transistors which provides extremely low power operation, a minimum amount of devices relative to known devices, maintenance of stored charge by leakage currents alone and reduced layout requirements for fabrication.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A memory cell having an active state and a quiescent state including a pair of cross-coupled transistors comprising means connected to said pair of cross-coupled transistors for causing one of said pair to assume one of an OFF and ON condition during said active state and leakage means at least a portion of which is integral with said transistors to provide simultaneously a given leakage current in one of said pair of transistors in the OFF condition and only a leakage current higher than said given leakage current through one of said pair of transistors in the ON condition.

2. A memory cell according to claim 1 further including at least a voltage source connected to said leakage means.

3. A memory cell according to claim 1 wherein said means for causing one of said pair to assume one of an OFF and ON condition includes a switching transistor connected to each of said pair of cross-coupled transistors.

4. A memory cell according to claim 3 wherein said leakage means further includes another portion integral with said switching transistors to pass said given leakage current and said current higher than said given leakage currents.

5. A memory cell according to claim 3 further including a first pulsed voltage source having a common connection to said switching transistors and second and third voltage sources being connected to one and the other of said switching transistors, respectively.

6. A memory cell according to claim 3 wherein said switching transistors are complementary transistors to said pair of cross-coupled transistors.

7. A memory cell according to claim 4 wherein said portion of the leakage means integral with said cross-coupled transistors and said other portion integral with said switching transistors are back-biased pn junctions.

8. A memory cell according to claim 7 further including a voltage source connected in series with said pn junctions.

9. A memory cell according to claim 6 wherein said complementary transistors are npn transistors.

10. A memory cell according to claim 6 wherein said complementary transistors are pnp transistors.

11. A memory cell having an active state and a quiescent state comprising:

first and second field effect transistors each having source, drain and gate electrodes, said gate electrodes of said first and second transistors being cross-coupled to said drain electrode of said second and first transistors, respectively, and said source electrodes connected to a common potential, third and fourth field effect transistors each having source, drain and gate electrodes disposed in series with said first and second field effect transistors, respectively, said third and fourth transistors being the complementary transistors to said first and second field effect transistors, said drain electrodes of the former being connected to said drain electrodes of the latter and said gate electrodes being interconnected, a first pulsed source connected to said gates of said third and fourth field effect transistors to simultaneously set said third and fourth field effect transistors in the conducting state, second and third pulsed sources connected to said sources of said third and fourth transistors, respectively, said first pulsed source and one of said second and third pulsed sources being actuated to set one of said first and second transistors in the conducting condition, said first pulsed source only being actuated to determine which of said first and second transistors is conducting during the active state, and leakage means, at least a portion of which is integral with each of said transistors to provide leakage currents only in said transistors during the quiescent state.

12. A memory cell according to claim 11 further including amplifier means connected to at least one of said third and fourth field effect transistors to detect the conducting condition of one of said first and second transistors.

13. A memory cell according to claim 11 wherein the transconductance of said first and second field effect transistors is greater than the transconductance of said third and fourth field effect transistors.

14. A memory cell having an active state and a quiescent state comprising, in combination:

first and second current paths each containing first and second actuable transistors, an actuating electrode of each of said first transistors being cross-connected to another electrode of said first transistors, a first pulsed voltage source connected to a control electrode of said second transistors, second and third pulsed voltage sources connected to said second transistors in said first and second paths, respectively, said first voltage source and one of said second and third voltage sources being activated to render one of said first transistors and said second transistors conductive during an active state, and at least first and second leakage paths at least a portion of which is integral with said first and second current paths, respectively, each comprising a voltage source connected to said second transistor, a first backward biased leakage portion in said second transistor connected to said source and to said actuating electrode, a second backward biased leakage portion in said first transistor connected to said atcuating electrode and to ground, said first and second backward biased leakage portions being operative in one of said first and second current paths when said first and second transistors are non-conducting to provide a potential at said actuating electrode substantially equal to the potential of one of said second and third voltage sources when actuated, said first backward biased leakage portion only being operative in the other of said first and second current paths when said first transistor in that path is conducting to limit current through said first transistor to a leakage current during the quiescent state.

References Cited

UNITED STATES PATENTS

| | | | |
|---|---|---|---|
| 3,177,373 | 4/1965 | Graham | 307—291 X |
| 3,177,374 | 4/1965 | Simonian. | |
| 3,355,721 | 11/1967 | Burns. | |
| 3,390,382 | 6/1968 | Igarashi. | |
| 3,309,534 | 3/1967 | Yu. | |
| 3,389,383 | 6/1968 | Burke | 340—173 |

OTHER REFERENCES

Feth: Memory Cell With Low Stand-by Power, IBM Tech. Disclosure Bulletin, vol. 9, No. 4, September 1966, pp. 420–421.

Keller: Integrated Fast-Read, Slow-Write Memory Cell Using IGFET, IBM Tech. Disclosure Bulletin, vol. 10, No. 1, June 1967, pp. 85–86.

G.E. Transistor Manual, Sixth ed., 1962, p. 11.

TERRELL W. FEARS, Primary Examiner

H. L. BERNSTEIN, Assistant Examiner

U.S. Cl. X.R.

307—279, 291